(12) United States Patent
Storm et al.

(10) Patent No.: US 6,552,333 B1
(45) Date of Patent: Apr. 22, 2003

(54) APPARATUS AND METHODS FOR DETERMINING GRAVEL PACK QUALITY

(75) Inventors: Bruce H. Storm, Houston, TX (US); Larry L. Gadeken, Houston, TX (US); Ward E. Shultz, Fulshear, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/639,556

(22) Filed: Aug. 16, 2000

(51) Int. Cl.[7] .................................................. G01V 5/10
(52) U.S. Cl. ..................... 250/269.3; 250/265
(58) Field of Search .............................. 250/269.3, 265, 250/269.4, 266

(56) References Cited

U.S. PATENT DOCUMENTS

| | | | |
|---|---|---|---|
| 4,423,323 A | * 12/1983 | Ellis et al. .................. | 250/264 |
| 5,469,925 A | * 11/1995 | Mueller et al. .............. | 175/61 |
| 5,481,105 A | * 1/1996 | Gold ........................... | 250/266 |
| 6,215,120 B1 | * 4/2001 | Gadeken et al. ............. | 250/256 |

* cited by examiner

*Primary Examiner*—Constantine Hannaher
*Assistant Examiner*—Otilia Gabor
(74) *Attorney, Agent, or Firm*—Vinson & Elkins LLP

(57) ABSTRACT

Apparatus and method for determining the integrity or quality of a gravel pack positioned between the casing and gravel pack screen of a subterranean borehole, with the method including azimuthally scanning the gravel pack for radiation, with detection of the radiation limited to a limited angular arc of the gravel pack at any one time, with the apparatus including shielded or collimated radiation source and/or detector.

17 Claims, 3 Drawing Sheets

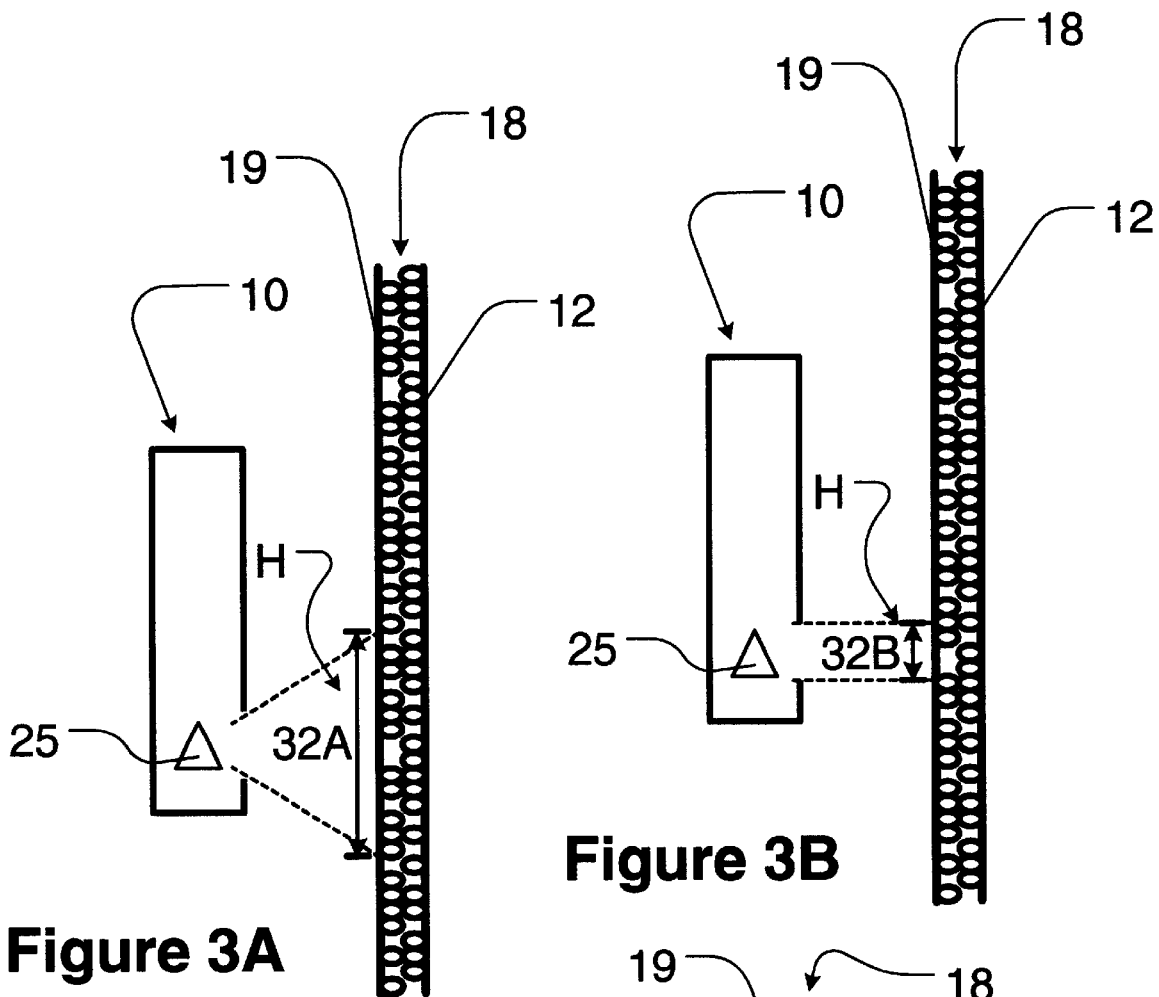
Figure 3A
Figure 3B
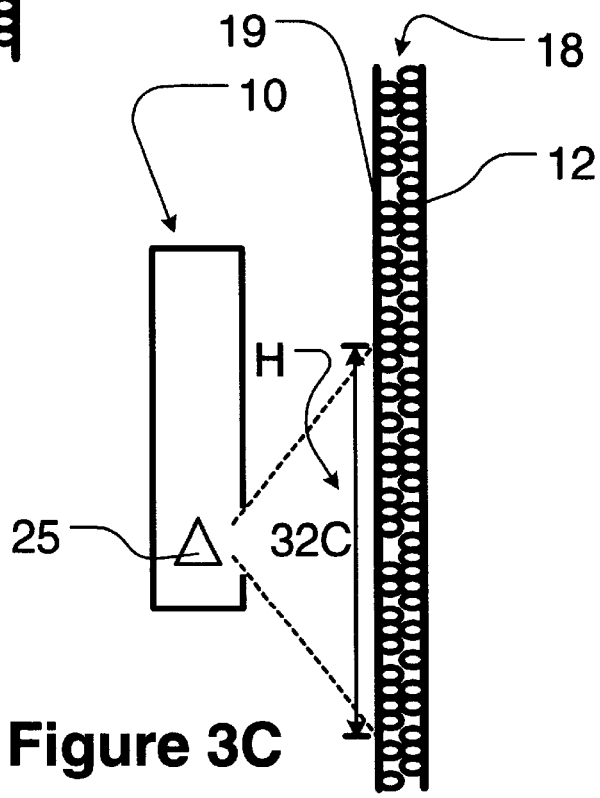
Figure 3C

APPARATUS AND METHODS FOR DETERMINING GRAVEL PACK QUALITY

BACKGROUND OF THE INVENTION

1. Field of the Invention

The present invention relates to apparatus and methods for use in the production of hydrocarbons. In another aspect, the present invention relates to apparatus and methods for examining gravel packs utilized in completed hydrocarbon wells. In even another aspect, the present invention relates to apparatus and methods for determining the quality of gravel packs utilized in completed hydrocarbon wells.

2. Description of the Related Art

Oil and gas wells are often completed in unconsolidated formations containing loose and incompetent fines and sand which migrate with fluids produced by the wells. The presence of formation fines and sand in the produced fluids is disadvantageous and undesirable in that the particles abrade pumping and other producing equipment and reduce the fluid production capabilities of the producing zones in the wells.

Heretofore, unconsolidated subterranean zones have been stimulated by creating fractures in the zones and depositing particulate proppant material in the fractures to maintain them in open positions. In addition, the proppant has heretofore been consolidated within the fractures into hard permeable masses to reduce the potential of proppant flow-back and migration of formation fines and sands through the fractures with produced fluids.

Thus, it is not hard to imagine that in the production of hydrocarbons from a subterranean formation penetrated by a wellbore, it is often necessary to address the problem of the production of fine particulate materials with the desired well fluids. Such fine particulate materials can cause abrasive wear on well components such as pumps, valves and tubular goods resulting in costly replacement. Additionally, these particulates must be separated from the desired well fluids before transport, processing or sale. Further, these particulate materials can accumulate in the wellbore and in the near wellbore area and greatly reduce or completely stop further production of the fluids of value.

Minimizing the production of particulate materials such as formation sand without reducing well productivity has long been the goal of sand control operations. Toward that goal, various technologies have been used including resin consolidation, gravel packing, overbalanced perforating with resin consolidation and the like.

For example, gravel packs which include sand screens and the like have commonly been installed in the wellbores penetrating unconsolidated zones. The gravel packs serve as filters and help to assure that fines and sand do not migrate with produced fluids into the wellbores.

In a typical gravel pack completion, a screen is placed in the wellbore and positioned within the unconsolidated subterranean zone which is to be completed. The screen is typically connected to a tool which includes a production packer and a cross-over, and the tool is in turn connected to a work or production string. A particulate material which is usually graded sand, often referred to in the art as gravel, is pumped in a slurry down the work or production string and through the cross over whereby it flows into the annulus between the screen and the wellbore. The liquid forming the slurry leaks off into the subterranean zone and/or through the screen which is sized to prevent the sand in the slurry from flowing there-through. As a result, the sand is deposited in the annulus around the screen whereby it forms a gravel pack. The size of the sand in the gravel pack is selected such that it prevents formation fines and sand from flowing into the wellbore with produced fluids.

Gravel pack technology has its own set of problems and limitations. These include problems in assuring placement uniformity and efficiency. Often, if not utilized correctly, or under certain circumstances, gravel packs also have the undesired side effect of reducing well productivity.

Specifically, a problem which is often encountered in forming gravel packs, particularly gravel packs in long and/or deviated unconsolidated producing intervals, is the formation of sand bridges in the annulus. That is, non-uniform sand packing of the annulus between the screen and the wellbore often occurs as a result of the loss of carrier liquid from the sand slurry into high permeability portions of the subterranean zone which in turn causes the formation of sand bridges in the annulus before all the sand has been placed. The sand bridges block further flow of the slurry through the annulus which leaves voids below the bridges formed. When the well is placed on production, the flow of produced fluids is concentrated through the voids in the gravel pack which soon causes the screen to be eroded and the migration of fines and sand with the produced fluids to result.

It is well known, that to be effective, the gravel pack must comprise densely packed sand without voids or cavities in the sand. If portions of the annulus around the screen are not packed completely with sand, formation fluids containing formation sand will quickly erode the screen, leading to a gravel pack failure. Further, if the gravel pack initially is not densely packed, subsequent compaction caused by, for example, flow of the formation fluids, can result in voids and cavities within the gravel pack.

There has been much prior art relating to evaluation of gravel packs.

U.S. Pat. No. 4,423,323, issued Dec. 27, 1983 to Ellis, et al., discloses a neutron logging method and apparatus for determining a formation characteristic free of environmental effects. Specifically, a neutron logging tool is passed through the borehole while irradiating the formation with neutrons. Neutrons exiting the formation are detected with neutron detectors and count rate signals are generated. In response to these signals, an indication of porosity, substantially independent of error due to tool standoff from said borehole wall, is produced. In addition, values of tool standoff are also generated. These standoff values are then filtered to reduce statistical variations and are used to generate improved indications of porosity. A further aspect is the determination of tool standoff, effective cement/casing thickness, or gravel pack quality from the relation between the logarithms of the count rates and the empirically derived response curves without an explicit down-hole measurement.

U.S. Pat. No. 4,587,423, issued May 6, 1986 to Boyce, discloses a method for gravel pack evaluation utilizing a logging tool with a gamma source and gamma detector. Using a Monte Carlo modeling of gravel pack conditions in a completed borehole, a straightforward expression for the determination of percent packing as a function of known or measurable borehole quantities is derived, from which an accurate quantitative gravel pack log may be obtained for purposes of evaluating gravel pack quality.

U.S. Pat. No. 4,783,995 issued Nov. 15, 1988, to Michel et al., discloses an apparatus and method for logging the density of a gravel pack installation in a drill hole while the gravel pack installation tool is being withdrawn from the drill hole. After the apparatus is recovered at the earth's surface, the density log is recovered by means of a dedicated surface readout module. The logged data of the density of the gravel packed zone is examined for voids in the gravel pack. If any such void is indicated from the data, remedial action can be taken promptly while the gravel pack equipment is still at the drill hole site.

U.S. Pat. No. 4,950,892 issued Aug. 21, 1990 to Olesen, discloses a method and tool for investigating a gravel pack located in the annulus between the tubing/screen and the casing of a borehole. The method includes moving a logging tool through the tubing/screen over the depth region of the gravel pack. The logging tool includes a neutron source able to emit neutrons at such an energy that their interaction with a first set of atoms indicative of the gravel pack quality causes the production of gamma rays, and at least one gamma ray detector. The method also includes deriving a measurement of the number of gamma rays resulting from the interaction of said neutrons and said first set of atoms of the gravel pack material, and which are detected by said detector over a predetermined counting time interval.

Olesen notes that prior investigations have indicated the applicability of wireline logging techniques to the evaluation of gravel packs, and makes reference to "Gravel Pack Evaluation", by M. R. Neal, first presented (Paper SPE 11232) at the 57th Annual Fall Technical Conference and Exhibition of the Society of Petroleum Engineers of AIME, New Orleans, LA, September, 1982, published Journal of Petroleum Technology, September, 1983, pp. 1611–1616. Olesen notes the paper describes the responses of three well logging tools, the compensated neutron tool (neutron source and two neutron detectors), the nuclear fluid density meter tool (gamma ray source and one gamma ray detector), and the dual-spacing gamma ray tool (gamma ray source and two gamma ray detectors), to various gravel pack situations and showed that each tool responded well to changes in density of the material in the annulus between the screen (of the gravel pack hardware) and the casing. Olesen finally notes that although Neal's work provided useful qualitative information concerning gravel pack quality, it did not provide a procedure by which a quantitative evaluation could be made.

Olesen makes further reference to research by M. R. Neal and J. F. Carroll, as reported in a paper entitled "A Quantitative Approach to Gravel Pack Evaluation", 6th SPE of AIME Formation Damage Symposium, Bakersfield, Calif., Feb. 13–14, 1984. Olesen notes this paper as demonstrating that tool response (count rate) could be directly related to the percent void space in the gravel pack, and led to the development of interpretive procedures for determining percent packing when field hardware is the same as that used for laboratory calibration measurements and for making a quick-look quantitative approximation when the well hardware differs from laboratory hardware.

U.S. Pat. No. 5,481,105, issued Jan. 2, 1996 to Gold, discloses an apparatus (sonde) and method of measuring density, or gravel pack quality, in a cased well borehole using a fast neutron source and one or more thermal neutron detectors is described. In one embodiment, a neutron source creates a fast neutron flux which reacts primarily with the material within the borehole casing while a collocated neutron detector counts the number of backscattered thermal neutrons. A novel means of obtaining azimuthal measurement discrimination is provided by a rotating neutron shield. In one instance the shield is quite substantial, creating a narrow measurement window. In another instance, the shield only marginally screens the detector, creating a large measurement window. In an alternative embodiment, a second thermal neutron detector is spaced distally from the neutron source and first detector. This second detector is used to provide a measurement of the borehole's background, or environmental neutron activity, and can be used to improve the quality of the sonde's gravel pack density measurement.

Gold further teaches it is possible to locate a void in the gravel with a tool which is responsive to density, and provides as an example, a density measuring device where there is a substantial contrast between the fluid in the pores and the gravel. Gold then notes that density measurement with a typical gamma ray fluid density tool is made all the more difficult as a result of recent advances which have been introduced for gravel pack materials. Gold further explains that the contrast in the density of the matrix and fluid has been reduced with the advent of new packing materials, and teaches away from use of a gamma ray density tool by commenting that "the loss in contrast in the density measurement between the matrix material and the pore fluid makes measurement the gamma density approach difficult, perhaps almost impossible."

Although not directed to use for evaluation of gravel packs, U.S. Pat. No. 5,841,135, issued Nov. 24, 1998, to Stoller et al., discloses a method and apparatus for measuring formation density and the formation photo-electric factor with a multi-detector gamma-gamma tool. Specifically, Stoller et al. disclose a method and tool for determining formation density by using an array of gamma-ray detectors. In this invention, the collimated detectors have varying depths of investigation into the formation. At small standoffs a short spaced (SS) detector investigates mainly the mud and mudcake and a shallow layer of the formation. Unlike the SS, a mid spaced (MS) detector has a deeper depth of investigation and is sensitive to borehole and formation even at increased standoffs. A long spaced (LS) detector is mainly sensitive to the formation density and its density reading is corrected by using the standoff information from the MS and SS detectors. In addition to measuring density, this invention can measure the photo-electric factor (PEF) of the formation. Because photo-electric absorption preferentially removes low energy gamma-rays, the tool housing needs to allow passage of low energy gamma-rays. This can be accomplished through the use of a window of a material with a low atomic number (Z) or through the use of a low-Z housing material like titanium. Typical window materials are beryllium and titanium. Housing materials can be titanium or for lower pressure requirements graphite or high-strength carbon compounds.

However, in spite of the above advancements, there still exists a need in the art for apparatus and methods for determining gravel pack density, quality or uniformity.

There is another need in the art for apparatus and methods for determining gravel pack density, quality or uniformity, which do not suffer from the disadvantages of the prior art apparatus and methods.

These and other needs in the art will become apparent to those of skill in the art upon review of this specification, including its drawings and claims.

SUMMARY OF THE INVENTION

It is an object of the present invention to provide for apparatus and methods for determining gravel pack density, quality or uniformity.

It is another object of the present invention to provide for apparatus and methods for determining gravel pack density, quality or uniformity, which do not suffer from the disadvantages of the prior art apparatus and methods.

It is even another object of the present invention to provide for apparatus and methods which improve on the prior art gamma density approaches limited by the loss in contrast in the density measurement between the matrix material and the pore fluid.

These and other objects of the present invention will become apparent to those of skill in the art upon review of this specification, including its drawings and claims.

According to one embodiment of the present invention, there is provided an apparatus for use in a completed well borehole, for evaluating a gravel pack positioned in a wellbore. The apparatus generally includes a housing suitable for positioning in the completed wellbore. The apparatus also includes a radiation source for providing radiation to the gravel pack. The apparatus even also includes a radiation detector attached to the housing, wherein the detector is suitable to provide azimuthal resolution of radiation from the gravel pack.

According to another embodiment of the present invention, there is provided an apparatus for use in a completed well borehole, for evaluating a gravel pack positioned in a wellbore. The apparatus generally includes a housing suitable for positioning in the completed wellbore. The apparatus also includes a radiation source attached to the housing, wherein the source is suitable to provide irradiation to a azimuthally resolve the gravel pack. Finally, the apparatus also includes a radiation detector for detecting radiation from the gravel pack.

According to even another embodiment of the present invention, these is provided an apparatus for use in a completed well borehole, for evaluating a gravel pack positioned in the wellbore. The apparatus includes a housing suitable for positioning in the completed wellbore. The apparatus also includes a radiation source for providing radiation to the gravel pack. The apparatus further includes n radiation detectors attached to the housing in a plane perpendicular to a longitudinal axis of the housing, wherein n detectors are suitable to provide azimuthal resolution of radiation from the gravel pack.

According to still another embodiment of the present invention, there is provided a method for evaluating a gravel pack positioned in the completed wellbore, the well bore having a longitudinal axis. The method includes azimuthally scanning the gravel pack for radiation, wherein during said scanning radiation is detected from an angular arc of the gravel pack between 1° and 359° at any one time.

According to yet another embodiment of the present invention, there is provided a method for evaluating a well bore gravel pack positioned in a completed wellbore. The method includes positioning in the well bore, a tool having a longitudinal axis, and the tool comprising n detectors positioned in a plane perpendicular to the longitudinal axis, wherein n is at least 1, and each detector is suitable for detecting radiation from an angular arc of the gravel pack, wherein the angular arc for each detector is independently selected to be between 1° and 359° at any one time. The method also includes detecting radiation with the detectors while moving the tool longitudinally through the well bore.

In more specific embodiments of the above embodiments, the radiation detector is collimated to preferentially receive radiation from an angular arc of the gravel pack of between 1° and 359° at any one time.

In an even more specific embodiment of the above embodiments, the radiation detector is collimated to preferentially receive radiation from an angular arc of the gravel pack of between 1° and $\alpha$ or between 1 and (360°−$\alpha$), wherein $\alpha$ is in the range of about 25° to about 155°. More specifically, the detector may comprises n detectors positioned in a plane perpendicular to the longitudinal housing axis, wherein n is at least 2, and wherein each detector is suitable to receive radiation from an angular arc of the gravel pack of between 1° and 359° at any one time, with or without overlap between the detectors.

These and other embodiments of the present invention will become apparent to those of skill in the art upon review of this specification, including its drawings and claims.

BRIEF DESCRIPTION OF THE DRAWINGS

FIGS. 3A through 3C, are schematic side views of tool 10, showing various non-limiting possible heights of investigation $\beta$ being 32A, 32B and 32C.

DETAILED DESCRIPTION OF THE INVENTION

Figure 1:
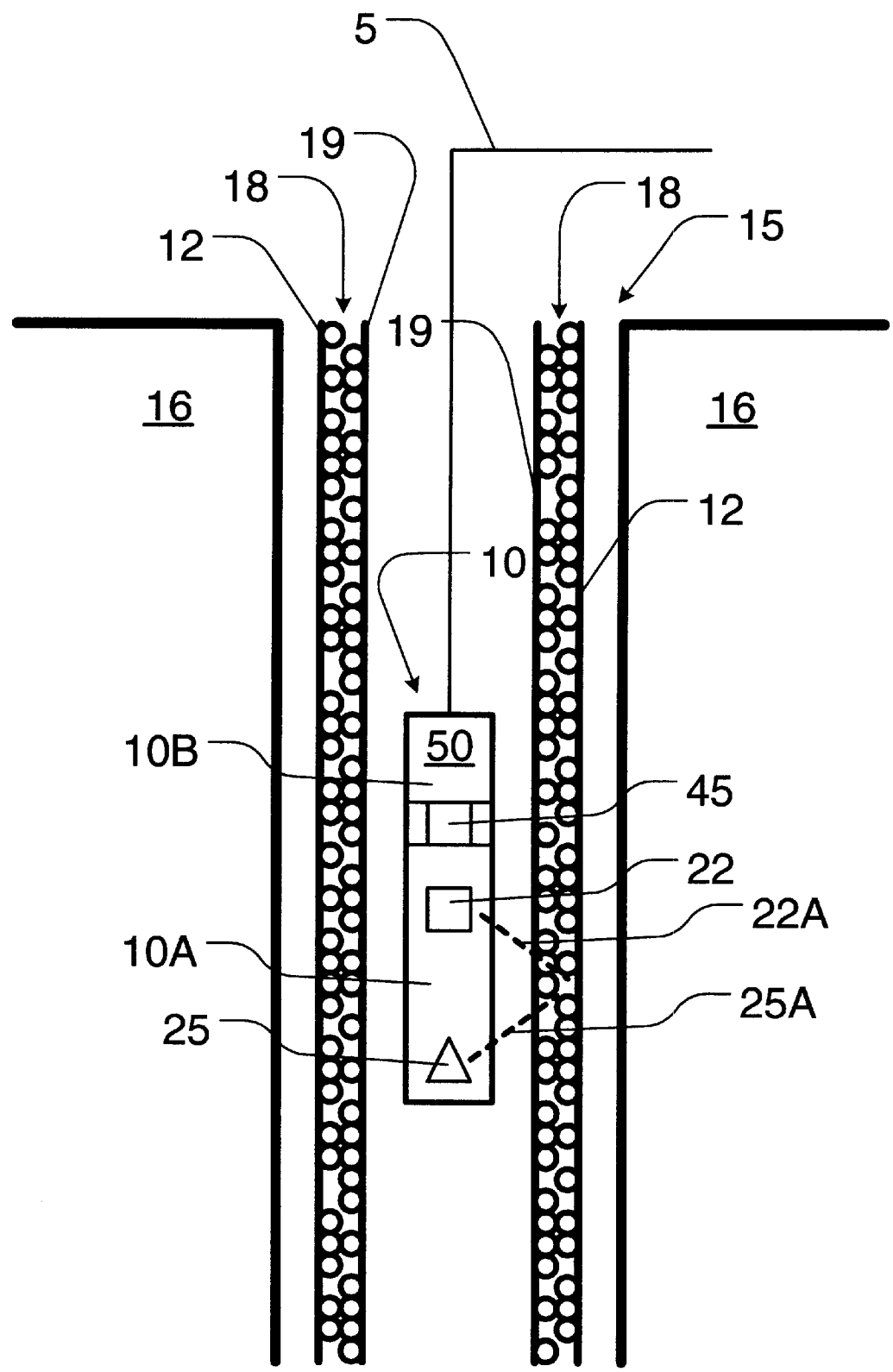
FIG. 1 is a schematic representation of the apparatus and method of the present invention, showing tool 10 having source 22 and receiver 25, with tool 10 positioned within casing 12 of a borehole 15 that is penetrating subterranean 16, and further showing a gravel pack 18 positioned in the annulus between casing 12 and gravel pack screen 19.
Figure 2A:
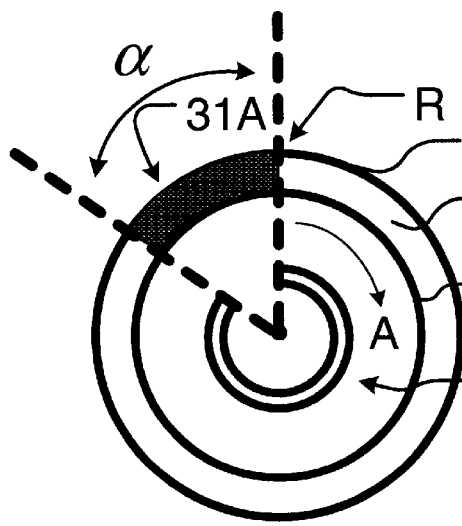
FIGS. 2A through 2D, are schematic top views of tool 10, showing azimuthal investigation of a given angular arc $\alpha$ of the gravel pack 18, starting at reference point R for gravel pack angular section 31A and advancing clockwise to gravel pack angular sections 31B, 31C and 31D going from FIGS. 2A through 2D.
Figure 2B:
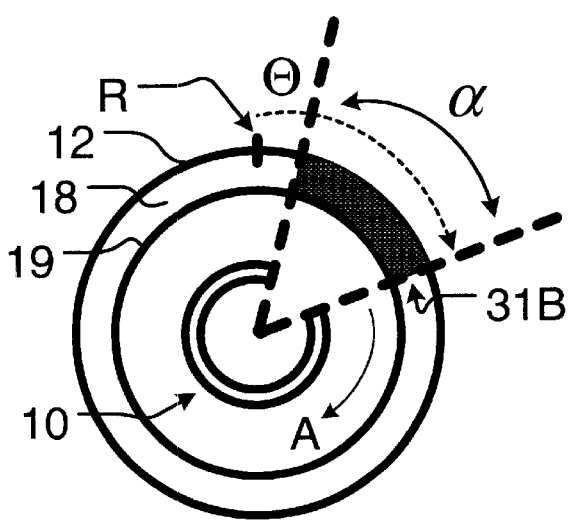
Figure 2C:
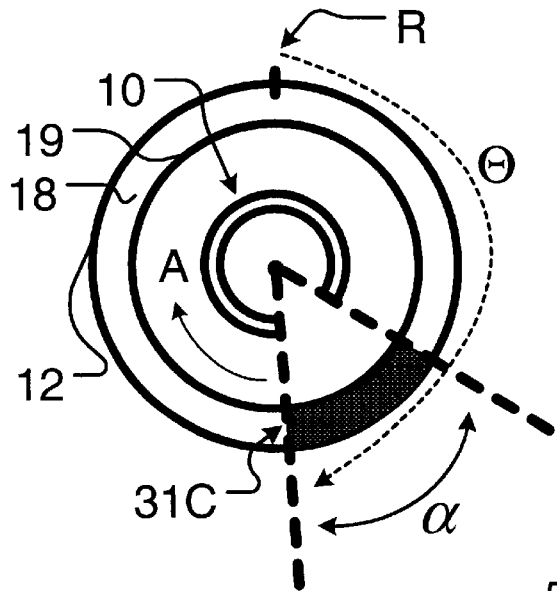
Figure 2D:
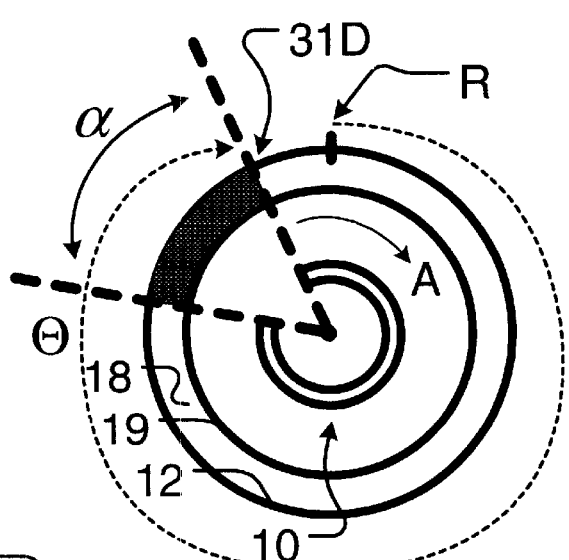

The method of the present invention for determining gravel pack integrity or quality includes azimuthally detecting radiation from the gravel pack, with the either the detecting of radiation from the gravel pack or the irradiating of the gravel pack limited to a given angular arc of the gravel pack at any one time. The method further includes processing the detected radiation to determine either directly or indirectly integrity or quality of the gravel pack.

In the method of the present invention, radiation may be provided to the gravel pack, with a certain amount of radiation scatted back to be detected, or alternatively radioactive tracers may be provided to the gravel pack to be detected.

Any suitable detectable source may be utilized in the practice of the present invention, with sources providing gamma-rays being more preferred. As non-limiting examples, the source for the preferred gamma-rays can either be a traditional chemical source ($^{137}$Cs, $^{60}$Co, or another suitable radio nuclide) or an electronic source (X-ray tube, betatron or other X-ray generating device).

In the practice of the present invention, any suitable detector may be utilized. Non-limiting examples of gamma-ray detectors useful in the present invention, include scintillation detectors (NaI, BGO, GSO or other scintillation materials) coupled to photomultipliers or other amplification devices. For some applications, semiconductor detectors or other detection devices may be preferable.

The present invention is operable with one detector. Optionally, two or more detectors, or even an array of detectors such as that utilized in the multi-detector gamma-ray formation density tool of U.S. Pat. No. 5,841,135, issued Nov. 24, 1998 to Stoller et al., and herein incorporated by reference.

While the '135 patent discloses a linear array of detectors along the length of the tool, the present invention also provides for more than one detector in a plane perpendicular to the longitudinal tool axis, i.e., an azimuthal plane. As will be explained below, this plane of detectors may be azimuthally rotatable by either rotating the detectors or the tool, or may be fixed.

The present invention is operable with one source. Optionally, more than one source may be utilized, and further optionally, sources may be selected to provide different types of radiation.

In the practice of the present invention, the preferred gamma source is $^{137}$Cs and the detection of gamma-rays is preferably performed by NaI, BGO or GSO scintillation detectors.

In the method of the present invention either the irradiating of the gravel pack or the detection of radiation from the gravel pack is limited to a given angular arc of the gravel pack at any one time. Alternatively, instead of detecting an angular arc $\alpha$, the present invention also anticipates detecting an angular arc $(360°-\alpha)$.

It should be noted that smaller angular arcs have the potential to provide greater angular resolution to pinpoint the location of the void or area of interest in the gravel pack (provided that suitable radiation count may be obtained.) However, there is a tradeoff between angular resolution and statistical uncertainty of the measurement of the radiation count.

Other factors that will influence the accuracy of the radiation count include source strength, angle subtended, detector size and/or efficiency, and the deconvolution response function.

In one method of the present invention, either the irradiating of the gravel pack or the detection of radiation from the gravel pack is limited to a given angular arc of the gravel pack at any one time. Preferably, it is the detection of radiation from the gravel pack that will be limited to a given angular arc of the gravel pack at any one time. For example, to limit the detection of radiation from the gravel pack to a certain angular arc, the detector may be appropriately shielded by the detector housing itself, or by shielding external to the detector housing.

Picturing the gravel pack as having the shape of a pipe, the present invention also includes azimuthal investigation of gravel pack, a given angular arc of the gravel pack at a time. In many instances, all 360° of the gravel pack will be investigated using a angular arc that is a fraction of 360°.

The present invention may also include, for the given angular arc of the gravel pack, investigation of a given height of that arc at a time.

Referring now to FIG. 1, there is shown a schematic representation of the apparatus and method of the present invention, showing tool 10 having source 22 and receiver 25, with tool 10 positioned within casing 12 of a borehole 15 that is penetrating subterranean 16. A gravel pack 18 is positioned in the annulus between casing 12 and gravel pack screen 19. In the embodiment as shown, source 22 provided radiation to gravel pack 18 with detector 25 detecting some amount of radiation.

Tool 10 may also include an electronics section 50 with the nuclear amplifiers, analog to digital converters and auxiliary circuits for the tool operation, with energy, and analog and/or digital communication provided through umbilical 5. Tool 10 may optionally be configured as a pad tool. Furthermore, while electronics section 50 is shown incorporated in upper section 10B in the embodiment as pictured, it should be understood that electronics section could be incorporated into source/detector section 10A, or could be positioned in a separate downhole housing and connector to tool 10, or even positioned on the surface and connected via umbilical 5.

Referring now to FIGS. 2A through 2D, there are shown schematic top views of tool 10, showing azimuthal investigation of a given angular arc $\alpha$ of the gravel pack 18, starting at reference point R for gravel pack angular section 31A and advancing clockwise to gravel pack angular sections 31B, 31C and 31D going from FIGS. 2A through 2D. Of course, this angular arc $\alpha$ may either be the limit of irradiation and/or of detection. Preferably, the source direction will be unlimited with the detectors limited to receiving radiation from the gravel pack in a angular arc $\alpha$ of the gravel pack.

In the practice of the present invention, angular arc $\alpha$ is generally selected to provide the desired resolution for the quality or integrity of gravel pack 18. For example, smaller $\alpha$'s provide greater azimuthal resolution, but at the cost of reduced count rate. Generally, angular arc $\alpha$ must be large enough to provide a rate count which is sufficiently high to provide statistical reliability, but not so large as to sacrifice azimuthal resolution. Generally, $\alpha$ will be greater than 0° and less than about 180°, preferably less than about 90°, more preferably less than about 45°, even more preferably less than about 25°, and still more preferably less than about 10°. Yet more preferably, $\alpha$ will be greater than 0° and less than about 5°.

Referring now to FIGS. 3A through 3C, there are shown schematic side views of tool 10, showing various non-limiting possible heights of investigation H being 32A, 32B and 32C. Similar to the selection of a suitable angular arc $\alpha$, height of investigation H must be large enough to provide a rate count which is sufficiently high to provide statistical reliability, but not so large as to sacrifice vertical resolution.

Of course, the selection of angular arc $\alpha$ and height of investigation H are dependent upon each other, in the sense that the volume of gravel pack of a given angular arc $\alpha$ having a given height H, must be large enough to provide a rate count which is sufficiently high to provide statistical reliability, but not so large as to sacrifice resolution. Notice, that increasing the resolution of one, either azimuthal or vertical resolution, may require decreasing the resolution of the other.

The source and/or detector may be limited by use of shielding, or otherwise collimated, to allow detection or irradiation of only a limited angular arc $\alpha$ of the gravel pack of height H. An example of collimation is provided in U.S. Pat. No. 5,841,135, issued Nov. 24, 1998, to Stoller et al., herein incorporated by reference, which provided an example of a collimated detector. It should be understood that this collimation of the gamma-ray source and/or the detectors will be optimized for any given gravel pack and borehole geometry and conditions to limit the gamma ray path to the desired limited angular portion of the gravel pack at any one time.

Shielding may also be provided to shield the detector from being directly irradiated by the source, as is known in the art.

In the practice of the present invention, it is generally desired to either irradiate or detect radiation through a given angular or azimuthal sweep $\Theta$ of the gravel pack. For example, referring again to FIGS. 2A thru 2D, this angular or azimuthal sweep $\Theta$ of gravel pack 18, is shown measured from starting reference point R. In many instances and applications, multiple complete sweeps of the gravel pack will be conducted.

This angular or azimuthal sweep Θ of the gravel pack may be accomplished in the present invention utilizing any number of suitable apparatus and methods. As a non-limiting example, the entire tool 10 may be rotated for example by attaching the tool to a rotating wash pipe, or any other pipe or tube. Motorized rotation may be provided from either a subsurface or surface source. As another non-limiting example, one or both of the source and/or receiver may be attached to a rotation portion of the tool. As a non-limiting example, in the embodiment as shown in FIG. 1, tool 10 includes lower section 10A that is rotatably attached to tool 10, includes upper section 10B having a motor 45 providing rotation to lower section 10A, and includes an umbilical 5 providing energy and communication to tool 10.

Figure 4:
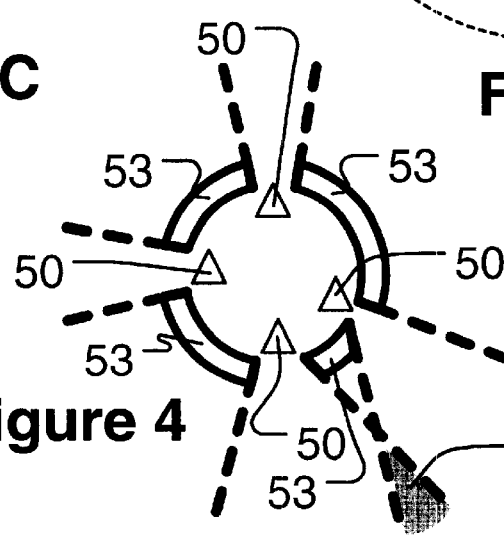

Alternatively, more than one detector may be utilized in the azimuthal plane, with or without detection overlap between the detectors. Referring now to FIG. 4, there are shown 4 detectors 50 and shields 53 in an azimuthal plane, with one area of overlap 55 between adjacent detectors. The n number of detectors positioned in an azimuthal plane will provide azimuthal sensitivity to the data, whether or not the tool scans azimuthally. Thus, the tool may be operated by moving it linearly through the well bore, with or without rotation.

In the practice of the present invention, it is generally preferred to maintain the desired spatial relationship between the source(s) and detector(s) during the azimuthal sweep of the gravel pack, this being preferred to simplify the interpretation of the detected radiation. It should be understood that in the practice of the present invention, any combination of relative movement between the source(s) and detector(s) is acceptable provided that the detected data can be interpreted. As a non-limiting example, one of the source or detector may be rotated at a first angular speed to azimuthally sweep the gravel pack, with the other either not rotated or rotated at a different angular speed. Of course, when more than one source and/or detector is utilized, the potential combinations of relative motion increase, and any suitable combination may be utilized.

There are a number of prior art methods for relating the count rate of detected gamma-rays to density, and those methods are applicable in the practice of the present invention. Such nuclear density methods rely on Compton scattering of gamma-rays in the formation to determine density measurements. In general, a spectra of the detected radiation can be generated, with an apparent density computed from the spectra. However, it must be noted that in the practice of the present invention, gravel pack quality may be determined either from using determined density, or from raw radiation counts, because the quality is shown by the presence or absence of one or more anomalies in the counting rate.

Referring again to FIG. 1, in the preferred practice of the present invention, gamma-rays 22A will be provided by tool source 22 into gravel pack 18. The gamma-rays will be scattered by the electrons in the gravel pack and some of gamma-ray 25A will be scattered back to tool detector 25 and be detected.

Depending on the spacing between the source and detector, the count rate of detected gamma-rays from the gravel pack will either increase with increasing gravel pack density (scattering term dominant) or decrease with increasing gravel pack density (attenuation effect predominant). At intermediate spacings, both attenuation and scattering terms influence the response.

At any given depth or depth interval, there can be generated a plot, graph, relationship, or database, of the gravel pack density as a circular or angular function around the gravel pack. Anomalies in the gravel pack density can be determined within the vertical and azimuthal resolution selected.

The present invention is useful for evaluating the uniformity and integrity of gravel packs. Specifically, the present invention is utilized to evaluate gravel packs for voids (or low or relatively lower density volumes) which result in increased flow rates and premature failure of the gravel pack screen.

The present invention is utilized to For example, the present invention may be utilized to obtain a radiation count rate, which provides an indication of the density, relative density, density variation, and the like, of the gravel pack between the screen OD ("outer diameter") and the casing ID ("inner diameter"). Notice, that in some instances, the raw radiation count rate may be sufficient to provide an indication of the gravel pack quality, whereas in other instances, it may be desired to correlate the count rate to a certain physical property.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

All patents, papers, articles and other references mentioned or cited in this patent specification, are herein incorporated by reference.

We claim:

1. An apparatus for use in a completed well borehole, for evaluating a gravel pack positioned in a wellbore, the apparatus comprising:
   (a) a housing suitable for positioning in the completed wellbore, said housing defining longitudinal axis;
   (b) a radiation source for providing radiation to the gravel pack;
   (c) at least two radiation detectors attached to the housing and positioned to receive radiation from the gavel pack, wherein the detectors are suitable to provide azimuthal resolution of radiation from the gravel pack, and wherein the detectors are positioned in a plane perpendicular to the longitudinal axis.

2. The apparatus of claim 1, wherein the radiation detector is collimated to preferentially receive radiation from an angular arc α of the gravel pack wherein α is between 1° and 359° at any one time.

3. The apparatus of claim 1, wherein the radiation detector is collimated to preferentially receive radiation from an angular arc α of the gravel pack, wherein α is between 0 and β or between 0 and (360°−β), wherein β is in the range of about 2° to about 180°.

4. The apparatus of claim 1, wherein the radiation detector is collimated to preferentially receive radiation from an angular arc α of the gravel pack, wherein α is between 0 and β or between 0 and (360°−β), wherein β is in the range of about 2° to about 90°.

5. The apparatus of claim 1, wherein the radiation detector is collimated to preferentially receive radiation from an angular arc α of the gravel pack, wherein α is between 0 and β or between 0 and (360°-β), wherein β is in the range of about 2° to about 45°.

6. The apparatus of claim 1, wherein each detector is suitable to receive radiation from an angular arc of the gravel pack, wherein the angular arc for each detector is independently selected to be between 1° and 359° at any one time.

7. The apparatus of claim 6, wherein there is no overlap between the particular arcs of the gravel pack detected by each of the detectors.

8. The apparatus of claim 6, wherein there is overlap between the particular arcs of the gravel pack detected by at least two of the detectors.

9. An apparatus for use in a completed well borehole, for evaluating a gravel pack positioned in the wellbore, the apparatus comprising:
(a) a housing suitable for positioning in the completed wellbore, said housing defining a longitudinal axis;
(b) a radiation source for providing radiation to the gravel pack, wherein the radiation source is collimated to preferentially irradiate an angular arc of the gravel pack of between 1° and 359° at any one time;
(c) n radiation detectors attached to the housing in a plane perpendicular to a longitudinal axis of the housing, wherein n detectors are suitable to provide azimuthal resolution of radiation from the gravel pack, wherein n is at least 2, and wherein at least 2 of the n detectors are positioned in a plane perpendicular to the longitudinal axis.

10. The apparatus of claim 9, wherein the n radiation detectors are each collimated to preferentially receive radiation from an angular arc of the gravel pack, wherein the angular arc for each detector is independently selected to be between 1° and 359° at any one time.

11. The apparatus of claim 9, wherein there is no overlap between the particular arcs of the gravel pack detected by each of the detectors.

12. The apparatus of claim 9, wherein there is overlap between the particular arcs of the gravel pack detected by at least two of the detectors.

13. A method for evaluating a gravel pack positioned in the completed wellbore, the well bore having a longitudinal axis, the method comprising:
(a) azimuthally scanning the gravel pack for radiation, wherein during said scanning radiation is detected from an angular arc of the gravel pack between 1° and 359° at any one time.
wherein in step (a), the scanning comprises scanning with at least 2 detectors positioned in a plane perpendicular to the longitudinal axis.

14. The method of claim 13, wherein in step (a), the scanning comprises scanning without overlap between the particular arcs of the gravel pack detected by each of the detectors.

15. The method of claim 14, wherein in step (a), the scanning comprises scanning with overlap between the particular arcs of the gravel pack detected by at least two of the detectors.

16. A method for evaluating a well bore gravel pack positioned in a completed wellbore, the method comprising:
(a) positioning in the well bore, a tool having a longitudinal axis, and the tool comprising n detectors positioned in a plane perpendicular to the longitudinal axis, wherein n is at least 2, and each detector is suitable for detecting radiation from an angular arc of the gravel pack, wherein the angular arc for each detector is independently selected to be between 1° and 359° at any one time;
(b) detecting radiation with the detectors while moving the tool longitudinally through the well bore.

17. The method of claim 16, wherein step (b) further comprises rotating the tool during detecting.

* * * * *